United States Patent [19]
Ostermeier

[11] Patent Number: 5,299,290
[45] Date of Patent: Mar. 29, 1994

[54] INK SENSING SYSTEM FOR VECTOR PLOTTERS
[75] Inventor: Bruce H. Ostermeier, Irvine, Calif.
[73] Assignee: CalComp Inc., Anaheim, Calif.
[21] Appl. No.: 834,969
[22] Filed: Feb. 14, 1992
[51] Int. Cl.⁵ .............................................. G06F 3/06
[52] U.S. Cl. ...................... 395/103; 346/75; 346/1.1; 346/139 R; 346/140 R; 101/DIG. 46; 101/492
[58] Field of Search ............... 346/140 R, 139 R, 1.1, 346/75; 101/DIG. 46, 492; 395/103

[56] References Cited
U.S. PATENT DOCUMENTS

| | | | |
|---|---|---|---|
| 4,255,754 | 3/1981 | Crean et al. | 346/75 |
| 4,328,504 | 5/1982 | Weber et al. | 346/75 |
| 4,435,674 | 3/1984 | Hevenor et al. | 318/640 |
| 4,751,517 | 6/1988 | Crean et al. | 346/75 |

Primary Examiner—Robert L. Richardson
Attorney, Agent, or Firm—Frederic P. Smith; William F. Porter, Jr.

[57] ABSTRACT

An ink sensing system for a vector plotter in which a pen is adapted to be raised and lowered from a drawing media surface along a system axis. An optical detection system is provided which has a focal point on the system axis and below the media surface when the pen is in its lowered position and at the media surface when the pen is in its raised position. The optical detection system includes a source of illumination and a detector system to determine the degree of reflectance from the media surface to indicate the presence or absence of ink on the media surface. In a particular embodiment the optical detection system is moveable and the movement of the optical detection system is coupled to the movement of the pen. Furthermore, the focal point of the optical detection system coincides substantially with the last point of contact of the pen with the media surface when the pen is in the raised position.

17 Claims, 2 Drawing Sheets

INK SENSING SYSTEM FOR VECTOR PLOTTERS

BACKGROUND OF THE INVENTION

1. Field of the Invention

The invention relates to the field of vector plotters and, in particular, to an ink sensing system for a vector plotter in which an optical detection system determines the degree of reflectance from a drawing media surface to indicate the presence or absence of ink on the media surface.

2. Description of Related Art

In the field of plotters using ink pens, it is necessary to determine, continuously or at intervals, that the ink is being properly laid down on the drawing media surface during the plotting process. Such failure can be due to lack of ink in the pen or due to obstructions in the pen itself which prevents the ink from flowing freely onto the media surface. In the former instance, infrared ink-level sensing systems have been proposed to monitor the ink level in the pen itself. In the latter instance, sensing systems have been proposed, such as those described in U.S. Pat. Nos. 3,335,287 and 4,435,674, which utilize light-emitting diodes and photodiode detectors carried on the drawing head to continuously monitor the line being drawn by detecting variations in the intensity of light reflected from the drawing media surface due to the presence or absence of ink to absorb the light focussed on the surface. These sensing systems have, however, several disadvantages. Since the sensors comprise a circular array of optical fibers located around the scriber, the optical fibers focus light on and scan an annular area of the plotting paper surrounding the tip of the pen. Since only a small portion of the focused light can be absorbed by ink on the surface of the media, the sensitivity to small variations in detected light is critical to the successful operation of the system. Furthermore, since the detector system looks at an annular area around the tip of the pen, the system is sensitive to what has been drawn but cannot detect the current status of the ink flowing onto the media surface. Finally, since the systems look at an annular area surrounding the pen and operate in a continuous back-looking mode, excessive power and expensive and complicated electronics are needed for successful operation of such systems.

Thus, it is a primary object of the present invention to provide an improved ink sensing system for a vector plotter.

It is another object of the present invention to provide an improved ink sensing system in which a positive indication is given as to the presence or absence of ink on a drawing media surface.

It is a further object of the present invention to provide an improved ink sensing system which can determine the current status of ink flowing onto the drawing media surface.

It is still another object of the present invention to provide an improved ink sensing system in which optical and electronic power requirements and complexity are minimized.

SUMMARY OF THE INVENTION

An ink sensing system for a vector plotter is provided in which a pen is adapted to be raised and lowered from a drawing media surface along a system axis. The ink sensing system includes an optical detection system which has a focal point on the system axis and below the media surface when the pen is in its lowered position and a focal point on the system axis and at the media surface when the pen is in its raised position. The optical detection system includes a source of illumination and a detector system to determine the degree of reflectance from the media surface to indicate the presence or absence of ink on the media surface. In a particular embodiment, the optical detection system is moveable and the movement of the optical detection system is coupled to the movement of the pen. Furthermore, the focal point of the optical detection system coincides substantially with the last point of contact of the pen with the media surface when the pen is in the raised position.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
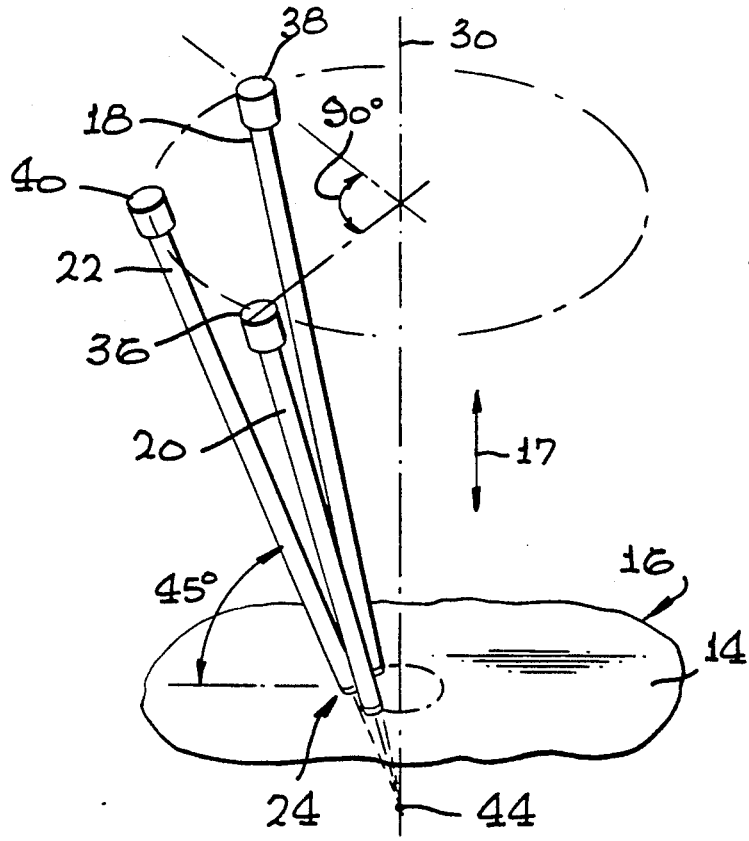
FIG. 1 is a simplified drawing illustrating the principle of operation of the present invention.
Figure 2:
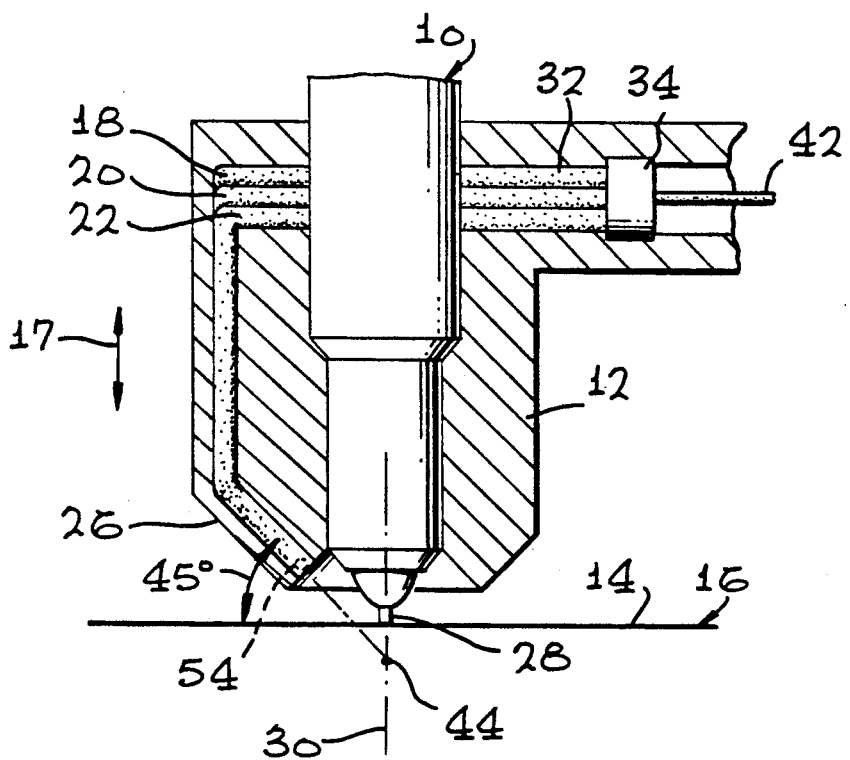
FIG. 2 is a partially cross-sectional side view of the ink sensing system of the present invention.
Figure 3:
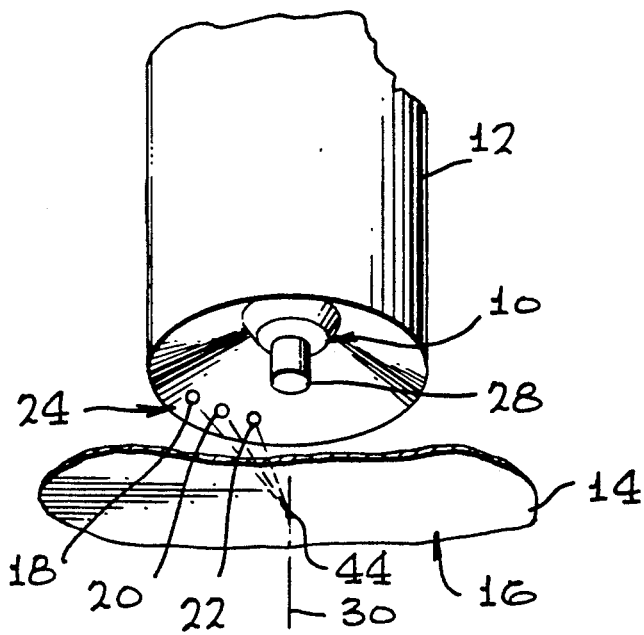
FIG. 3 is an isometric view of the present invention.

Referring now to FIGS. 1, 2, and 3, a pen 10 is carried by a penholder 12 over the surface 14 of a drawing media 16. The penholder 12 is adapted, as described hereinafter, to move in a vertical direction toward and away from surface 14, as indicated by arrow 17, and, alone or in conjunction with movement of the drawing media 16, is adapted to cause the pen 10 to lay down a line of ink on the surface 14 in two dimensions. A system for driving penholder 12 in longitudinal and vertical directions is described in U.S. Pat. Nos. 4,777,727, 4,872,023, and 4,935,878, whose teachings are incorporated herein by reference. The penholder 12 also carries a plurality of optical fibers 18, 20, 22 arranged in an array 24 in the bottom portion 26 of the penholder 12 around the point 28 of the pen 10. The optical fibers 18, 20, 22 join in a fiber optic bundle 32 after leaving the bottom portion 26 of the penholder 12 and are coupled to an array 34 of light emitting diodes (LEDs) 36, 38 and a photodiode (or a photo-transistor) 40. Electrical signals to actuate the LEDs 36, 38 and to carry the output of the photodiode 40 are carried by electrical bundle 42. As shown in FIGS. 1 and 3, the optical fibers are located within a 90° arc about the system axis 30 and are tilted off-axis at a 45° angle. While these angles are chosen mainly for convenience of fabrication, the off-axis tilt of the optical fibers is chosen so that the focal point 44 of the detection system is below the surface 14 of the drawing media when the point 28 of the pen 10 is in contact with the surface 14 of the drawing media 16 and is at the surface 14 when the pen 10 is in a raised position.

In the operation of a vector plotter, as the pen 10 plots on the surface 14 of the drawing media 16, the pen 10 lifts from and drops to the surface 14 at the beginning and end of each vector. Since the pen 10 is carried by the penholder 12 which also carries the optical fibers 18, 20, 22, and other optical components hereinafter described, all the components of the optical system move up and down with the pen 10 as a unit. Thus, each time the pen 10 lifts vertically, the focal point 44 of the optical system moves vertically through the drawing media 16 at substantially the last point of contact of the pen 10 with the surface 14. During the lifting movement of the pen 10, the LEDs 36, 38 are pulsed off and on at a rapid-duty cycle, the pulse rate being able to be lower if the depth of field of the optical system is greater i.e. the pulse rate is inversely proportional to the depth of the field of the optical system. The photodiode 40 detects the presence of an ink mark from the pen 10 by an attenuation to the normal signal produced by light from the LEDs 36, 38 being diffusely reflected from the normally blank surface 14 of the drawing media 16 and detected by the photodiode 40.

Figure 4:
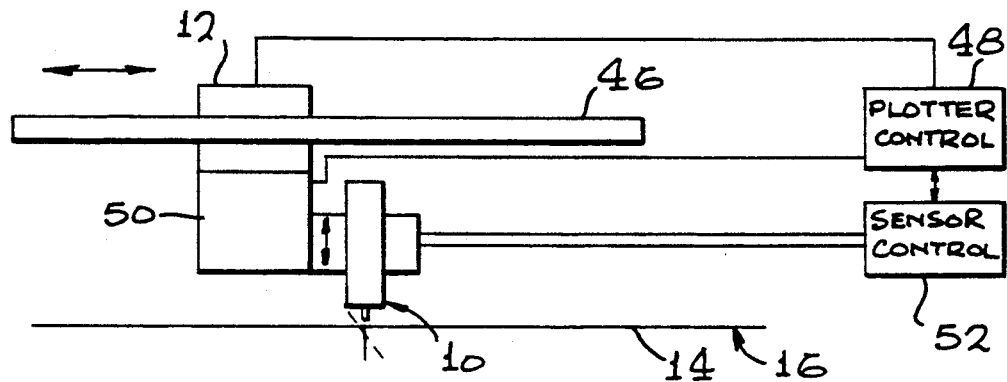
FIG. 4 is a simplified view of a typical plotter pen moving mechanism coupled to electronics suitable for the operation of the present invention.
Figures 5, 6:
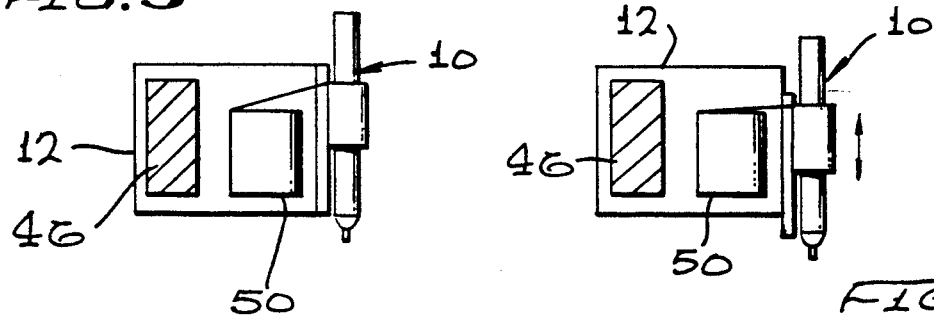
FIG. 5 is a side view of a typical approach to pen lowering and raising.
FIG. 6 shows the apparatus of FIG. 5 and its manner of lowering a pen.

As shown more explicitly in FIGS. 4–6, the pen 10 is carried by penholder 12 along a beam 46. The penholder 12 and the beam 46 comprise a linear motor system and are actuated by plotter control 48. The pen 10 is slidable with respect to the penholder 12 and is biased to a raised position by a spring, or the like (not shown). A solenoid actuator 50 electrically coupled to the plotter control 48 causes the pen 10 to slide vertically downward to the surface 14 at the beginning of each vector upon a current being applied to the solenoid actuator 50 by the plotter control 48. At the end of each vector, the plotter control 48 removes the current from the solenoid actuator 50 causing the bias spring to return the pen 10 to its original position. Simultaneously with the removal of such current by the plotter control 48, the plotter control 48 sends a signal to sensor control 52 which activates LEDs 36, 38 and photodiode or phototransistor 40. Sensor control 52, upon receiving the output of photodiode or phototransistor 40, compares such output to a preselected voltage or current level in a standard comparator circuit, and if such output exceeds such level, indicating a lack of attenuation by the total absence of ink on the surface 14, or an insufficient amount of such ink, sensor control 52 sends a signal to plotter control 48 to cause further plotting to stop. At the beginning of each vector, the plotter control 48 sends a signal to the sensor control 52 to deactivate the operation of LEDs 36, 38 and photodiode 40.

In a particular embodiment, the LEDs 36, 38 produce light in the green and the red portion of the light spectra allowing the detection of the eight colors commonly used in vector plotters, namely: black, blue, red, green, brown, orange, magenta, and purple. The addition of a third LED producing blue light would allow detection of any color. The optical fibers 18, 20, 22 are 1.00 mm in diameter with an overall 2.2 mm diameter including the sheath. The lenses for the optical system are spherical ball lenses, 2.375 mm in diameter, with the image distance being approximately 9.06 mm and the object distance being −12.09 mm, producing an image size of 0.75 mm and a magnification of −0.75. While high-quality optics are not required, a maximum blur spot of 0.75 mm is preferred. The ball lenses would be inserted in the channels in the penholder 12 holding the optical fibers 18, 20, 22, as indicated by numeral 54 in FIG. 2. While the use of a plurality of pulsed LEDs is preferred because of better signal-to-noise ratio, a non-pulsed single LED or a white incandescent light source carried by a single optical fiber could be used to reduce system costs as long as interference from stray light is minimized. In addition, aspherical lenses can be used to more precisely focus the light from the LEDs.

While the invention has been described with reference to a particular embodiment, it should be understood that the embodiment is merely illustrative as there are numerous variations and modifications which may be made by those skilled in the art. The optical detection system, for example, could be mounted separately from the penholder and the movement of its focal point slaved to the movement of the pen by the plotter control. Thus, the invention is to be construed as being limited only by the spirit and scope of the appended claims.

I claim:

1. An ink sensing system for a vector plotter comprising:
   a pen adapted to be raised from and lowered to a drawing media surface along a system axis; and
   an optical detection system having a focal point on said system axis and below said media surface when said pen is in its lowered position and at said media surface when said pen is in its raised position, said optical detection system including a source of illumination and a detector system to determine, whenever said pen is raised from said media surface, the degree of reflectance from said media surface to indicate the presence or absence of ink on said media surface.

2. The system of claim 1 further comprising plotter control means for raising and lowering said pen and sensor control means coupled to said plotter control means for activating said source of illumination and said detector system during the upward movement of said pen and for receiving the output of said detector system to determine said degree of reflectance.

3. The system of claim 1 wherein said optical detection system is moveable and further comprising means to couple the movement of said optical detection system with the movement of said pen.

4. The system of claim 1 wherein said optical detection system is coupled to said pen and the movement thereof.

5. The system of claim 1 wherein the focal point of said optical detection system coincides substantially with the last point of contact of said pen with said media surface when said pen is in said raised position.

6. The system of claim 1 wherein said source of illumination and said detector system are positioned off of said system axis and tilted at a 45° angle to said system axis.

7. The system of claim 1 wherein said source of illumination and said detector system are positioned off of said system axis and are confined to a 90° arc about said system axis.

8. The system of claim 2 wherein said sensor control means pulses said source of illumination during the upward movement of said pen.

9. The system of claim 8 wherein the rate of said pulses is inversely proportional to the depth of field of said optical detection system.

10. The system of claim 1 wherein said source of illumination and said detector system are coupled to fiber optic media.

11. The system of claim 1 wherein said source of illumination comprises one or more light emitting diodes.

12. The system of claim 11 wherein said light emitting diodes are red and green light emitting diodes.

13. The system of claim 12 further comprising a blue light emitting diode.

14. The system of claim 1 wherein said source of illumination comprises a white incandescent light source.

15. The system of claim 1 wherein said detector system includes a photodiode or a phototransistor.

16. The system of claim 1 wherein said optical detection system further includes a spherical lens to focus said source of illumination and said detector system at said focal point.

17. The system of claim 1 wherein said optical detection system further includes an aspherical lens to focus said source of illumination and said detector system at said focal point.

* * * * *